(12) United States Patent
Corretja et al.

(10) Patent No.: US 10,830,883 B2
(45) Date of Patent: Nov. 10, 2020

(54) METHOD FOR FILTERING THE GROUND AND/OR SEA CLUTTER ECHOES INTERCEPTED BY AN AIRBORNE RADAR, AND RADAR IMPLEMENTING SUCH A METHOD

(71) Applicant: THALES, Courbevoie (FR)

(72) Inventors: Vincent Corretja, Merignac (FR); Bernard Joseph, Merignac (FR); Rodolphe Cottron, Merignac (FR); Philippe Goy, Merignac (FR)

(73) Assignee: THALES, Courbevoie (FR)

( * ) Notice: Subject to any disclaimer, the term of this patent is extended or adjusted under 35 U.S.C. 154(b) by 213 days.

(21) Appl. No.: 16/125,727

(22) Filed: Sep. 9, 2018

(65) Prior Publication Data
US 2020/0025901 A1    Jan. 23, 2020

(30) Foreign Application Priority Data
Sep. 14, 2017  (FR) ...................... 17 00931

(51) Int. Cl.
*G01S 13/524* (2006.01)
*G01S 13/20* (2006.01)
*G01S 13/526* (2006.01)

(52) U.S. Cl.
CPC .......... *G01S 13/5246* (2013.01); *G01S 13/20* (2013.01); *G01S 13/526* (2013.01)

(58) Field of Classification Search
CPC combination set(s) only.
See application file for complete search history.

(56) References Cited

U.S. PATENT DOCUMENTS

| 5,416,488 A | 5/1995 | Grover et al. |
| 5,485,157 A * | 1/1996 | Long .................. G01S 7/2927 |
| | | 342/159 |
| 5,784,026 A * | 7/1998 | Smith ................. G01S 13/5242 |
| | | 342/106 |
| 8,717,230 B1 | 5/2014 | Fischi et al. |
| 8,947,294 B1 | 2/2015 | Wasiewicz et al. |

(Continued)

FOREIGN PATENT DOCUMENTS

WO    2016/066540 A1    5/2016

OTHER PUBLICATIONS

Conte, et al., "Design and analysis of a knowledge-aided radar detector for doppler processing", IEEE Transactions on Aerospace and Electronic Systems, vol. 42, Issue: 3, pp. 1058-1079, Jul. 2006.

(Continued)

*Primary Examiner* — Mamadou L Diallo
(74) *Attorney, Agent, or Firm* — BakerHostetler

(57) ABSTRACT

The echoes being picked up in the distance-speed domain, the method being wherein it includes a step of producing a mask, in the distance-speed plane, overlying the zone of detection of the ground and/or sea clutter echoes picked up by the sidelobes, the zone being determinable by the antenna parameters of the radar, the waveform emitted by the radar and the environmental context of the radar, all the points of the distance-speed plane which are covered by the mask being assigned a characteristic which is specific to the mask; a step of filtering the received echoes, in which the echoes covered by the mask are rejected from the radar reception processing.

7 Claims, 4 Drawing Sheets

(56) References Cited

U.S. PATENT DOCUMENTS

| | | | |
|---|---|---|---|
| 2011/0133979 A1* | 6/2011 | Huizing | G01S 13/536 |
| | | | 342/29 |
| 2011/0160941 A1* | 6/2011 | Garrec | G01S 13/933 |
| | | | 701/17 |
| 2011/0181455 A1* | 7/2011 | Vanuytven | G01S 13/44 |
| | | | 342/27 |
| 2014/0085449 A1* | 3/2014 | Mandelis | H04N 7/183 |
| | | | 348/77 |
| 2018/0356509 A1* | 12/2018 | Haghighi | G01S 7/41 |
| 2019/0033441 A1* | 1/2019 | Gonz Les Valdes | |
| | | | F41H 11/136 |

OTHER PUBLICATIONS

Fan, et al., "An overview of knowledge-aided clutter mitigation methods for airborne radar", Tien Tzu Hsueh Pao/Acta Electronica Sinica, 40(6), pp. 1199-1206, Jun. 2012.

Xie, et al., "Knowledge-Aided Bayesian Optimum Radar Detector", Proceedings of International Conference on Computer Science and Information Technology, Advances in Intelligent Systems and Computing, vol. 255., pp. 83-93, 2014.

* cited by examiner

METHOD FOR FILTERING THE GROUND AND/OR SEA CLUTTER ECHOES INTERCEPTED BY AN AIRBORNE RADAR, AND RADAR IMPLEMENTING SUCH A METHOD

CROSS-REFERENCE TO RELATED APPLICATIONS

This application claims priority to foreign French patent application No. FR 1700931, filed on Sep. 14, 2017, the disclosure of which is incorporated by reference in its entirety.

FIELD OF THE INVENTION

The present invention relates to a method of improving filtering in a radar reception chain of the ground and/or sea clutter echoes intercepted by the sidelobes along the elevation axis of an airborne radar. The invention also relates to a radar able to implement such a method.

The invention applies in particular in respect of airborne surveillance radars for monitoring aerial or terrestrial targets.

BACKGROUND

In the field of the monitoring of aerial or terrestrial targets, a technical problem to be solved is the re-sensitization of the air/air and ground/air or GMTI (Ground Moving Target Indicator) detection modes in combination with the control of false alarm rates. By "re-sensitization" is meant the fact of recovering totally or in part a lost level of sensitivity corresponding to a desensitization.

In the air/air and GMTI detection modes, the land is a disturbing element. Indeed when the sidelobes of the antenna intercept the ground, the power of the land clutter is significant enough to generate false secondary echoes, these secondary echoes corresponding to the clutter picked up by the sidelobes in elevation. This clutter then disturbs detection, giving rise in particular to:
  non-control of the false alarm rate, because of the false alarms generated by the false secondary echoes;
  an increase in the unnecessary calculational burden due to the creation of "fake" pursuit tracks initialized by the false detections of the sidelobes;
  and a confused tactical situation, resulting in particular from the previous two points.

Moreover, land clutter influences the detection threshold and thus desensitizes the detection of aerial and terrestrial targets. Indeed, the filtering of the secondary echoes to stabilize the constant false alarm rates is carried out by increasing the detection thresholds, at the price of a reduction in sensitization of the radar in terms of detection, or desensitization of the radar.

The detection threshold is thus no longer optimized for the detection of small targets, more precisely for targets of low RCS (Radar Cross-Section). Stated otherwise, land or sea clutter makes it necessary to increase the detection threshold and thus desensitizes the detection of aerial and terrestrial targets, this results in:
  non-detection of targets with low RCS deploying in the speed domain of the land clutter, to within the speed ambiguity rank;
  a degraded detection probability for targets with low RCS close to the speed domain of the land clutter (or sea clutter), to within this speed ambiguity rank.

Prior art solutions attempt to surmount this problem. These solutions pertain to the improvement of radar detection processing on the basis of a priori information. The majority of them relate solely to the detection of maritime or terrestrial targets.

In particular, in the document by X.-K. Fan and Y. Qu, "An Overview of Knowledge-Aided Clutter Mitigation Methods for Airborne Radar," Chinese Journal of Electronics, Vol. 40, No. 6, pp. 1199-1205, 2012, a priori information originating from sources other than the radar is used for detection.

In the document by E. Conte, A. De Maio, A. Farina and G. Foglia, "Design and Analysis of a Knowledge-Aided Radar Detector for Doppler Processing", IEEE Transactions on Aerospace and Electronic Systems, Vol. 42, n 03, pp. 1058-1079, 2006, digital terrain models are used as a priori information to optimize the detection processings. Thereafter, a priori information on the statistics of the clutter encountered can be used as is the case in the document by H. Xie, J. Shi, H. Tian, B. Luan and P. Zhou, "Knowledge-Aided Bayesian Optimum Radar Detector", Proceedings of International Conference on Computer Science and Information Technology, pp. 83-93, 2013, where the texture of the clutter is assumed to be distributed according to an inverse Gamma law.

Within the framework of the detection of aerial and terrestrial targets, a solution can be to deactivate the detection function over the whole of the speed (or Doppler frequency) domain of the land clutter, that is to say in the speed (or Doppler frequency) domain in which the land clutter lies. The detection of the secondary echoes is thus avoided.

A drawback of this solution is that it does not permit any detection over the speed domain corresponding to the ground clutter, causing a notch in the detected-speeds axis.

SUMMARY OF THE INVENTION

An aim of the invention is in particular, in addition to the control of the false alarm rate, to re-sensitize the detection chain of an airborne radar so as to detect aerial or terrestrial targets as close as possible to the clutter zones. For this purpose, the subject of the invention is a method of filtering in a radar reception chain of the ground and/or sea clutter echoes intercepted by the sidelobes of an airborne radar, the said echoes being picked up in the distance-speed domain, the said method comprising:
  a step of producing a mask, in the distance-speed plane, overlying the zone of detection of the ground and/or sea clutter echoes picked up by the said sidelobes, the said zone being determinable by the antenna parameters of the said radar, the waveform emitted by the said radar and the environmental context of the said radar, all the points of the said distance-speed plane which are covered by the said mask being assigned a characteristic which is specific to the said mask;
  a step of filtering the received echoes, in which the echoes covered by the said mask are rejected from the radar reception processing.

The said characteristic is for example a binary value.

The points not covered by the said mask are for example assigned the complementary binary value.

In a possible mode of implementation, the antenna parameters being the antenna pattern and the squint of the antenna, the environmental context being the position, the attitude and the speed of the carrier of the said radar, the step of producing the said mask consisting in assigning the points of the said distance-speed plane the said characteristic, the said step comprises the following steps:

the antenna pattern is sampled in elevation according to a given angular sampling interval, the samples obtained corresponding to the main lobe and to the sidelobes of the said pattern;

for each sample:
the direction of pointing is calculated in the frame of the antenna as a function of the angular parameters of the antenna squint;
a change of frame is performed so as to express the direction of pointing of the antenna in the NED (North/East/Down) frame of the said carrier, as a function of the position, of the attitude and of the speed of the said carrier, and also as a function of the squint of the antenna;
the distance and the Doppler frequency of the said sample are calculated on the basis of the NED frame as a function of the parameters of the emitted waveform, the said sample thus being positioned in the distance/speed domain;
the said characteristic is allocated to the said sample of the distance-speed plane if it corresponds to a sidelobe.

In an initial step, all the points of the distance-speed domain are for example assigned a binary value, the points of the said samples corresponding to the sidelobes being assigned the complementary binary value.

In a possible mode of implementation, the detection chain comprising a pulse compression processing, a Fourier transform and a processing with constant false alarm rate CFAR:
the echoes marked by the said characteristic specific to the mask are not taken into account in the CFAR processing;
detections, if any, on output from the CFAR corresponding to echoes marked by the said characteristic are rejected.

The said method uses for example a digital terrain model to specify the altitude in the said environmental context.

The subject of the invention is also a radar able to implement such a method.

BRIEF DESCRIPTION OF THE DRAWINGS

Other advantages and characteristics of the invention will become apparent with the aid of the description which follows, offered in relation to appended drawings which represent.

DETAILED DESCRIPTION

Figure 1:
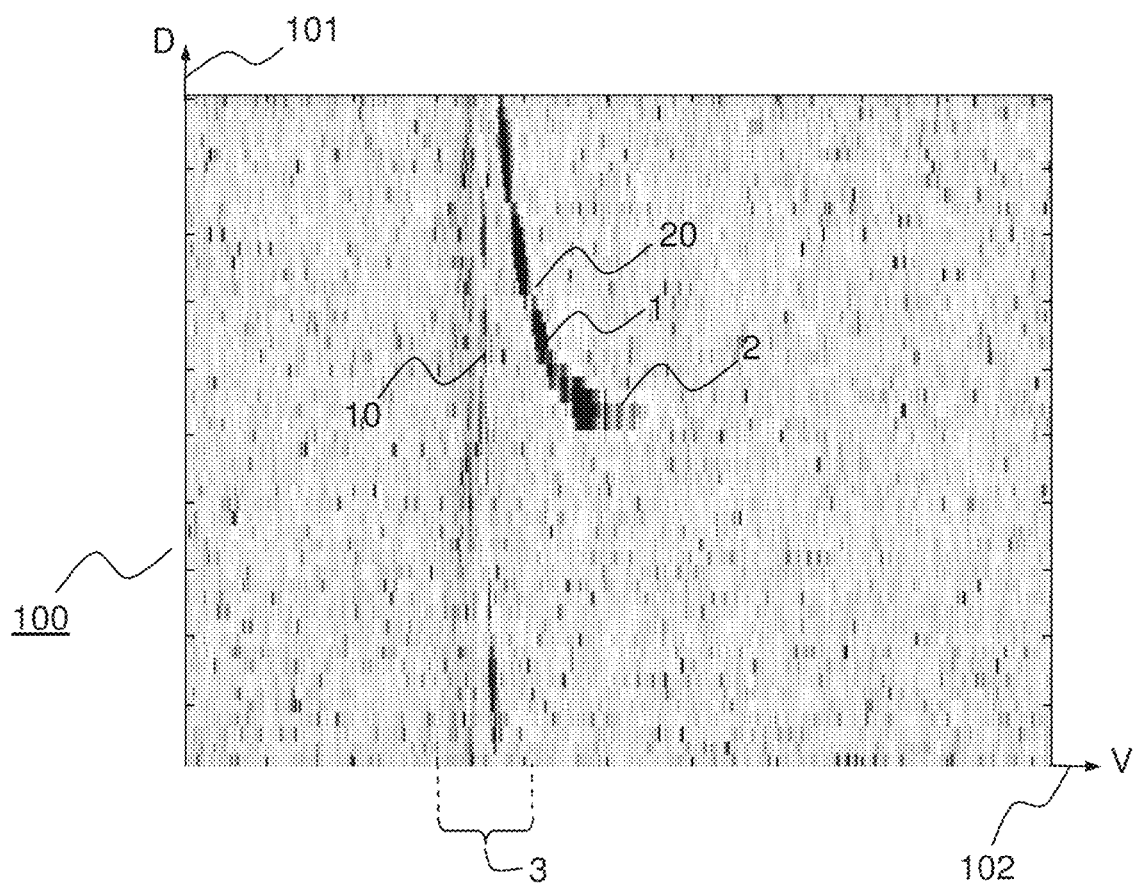
FIG. 1, a representation of the ground clutter backscattered by the main lobe, the sidelobes and the lobes scattered in elevation, in the distance/speed domain.

FIG. 1 illustrates the representation, in the distance/speed domain 100, of an exemplary block of real data. The ordinate axis 101 represents the distances D and the abscissa axis 102 represents the speeds V or Doppler frequencies. Hereinafter, the terms speed, Doppler frequency or Doppler may be employed interchangeably.

These data correspond to echoes picked up in elevation over several radar emission recurrences, these echoes can correspond to real targets or to secondary echoes.

The echoes picked up, that is to say the signals received in the radar reception chain, are compressed by a conventional pulse compression. Next, a fast Fourier transform (FFT) is applied for each distance bin on the horizon of the data block (over the said recurrences) so as to pass to a representation in two dimensions, more precisely so as to obtain the representation in the distance/speed domain 100 such as illustrated for example by FIG. 1. An echo is detected according to its power level in the distance/speed domain 100, detection depending on the detection threshold adopted.

In the representation of FIG. 1, the zones 1 in black and the zones 2 in grey represent the ground clutter intercepted by the sidelobes in elevation. Conventionally, one thus sees a zone consisting of two branches 10, 20 composed of sidelobe echoes, therefore of false echoes. A first branch 10 is parallel to the distance axis 101, it is centred on the zero or substantially zero speed, more precisely on a speed equal to 0 m/s for land clutter and on a speed of the order of a few metres per second for sea clutter. A second branch 20 recedes from the first branch in the form of an inverted J.

The clutter intercepted by the sidelobes, which are represented in these branches 10, 20, produces false alarms. A solution for removing the clutter echoes picked up by the sidelobes can consist in creating a Doppler notch 3 in which any detection is filtered. This Doppler band 3 can lie between 0 and 30 m/s for example.

This solution is however unsatisfactory since it prevents any detection in this Doppler band 3 and thus desensitizes detection. Moreover, it does not cover the second branch 20 and does not eliminate the detection of corresponding secondary echoes.

Figure 2:
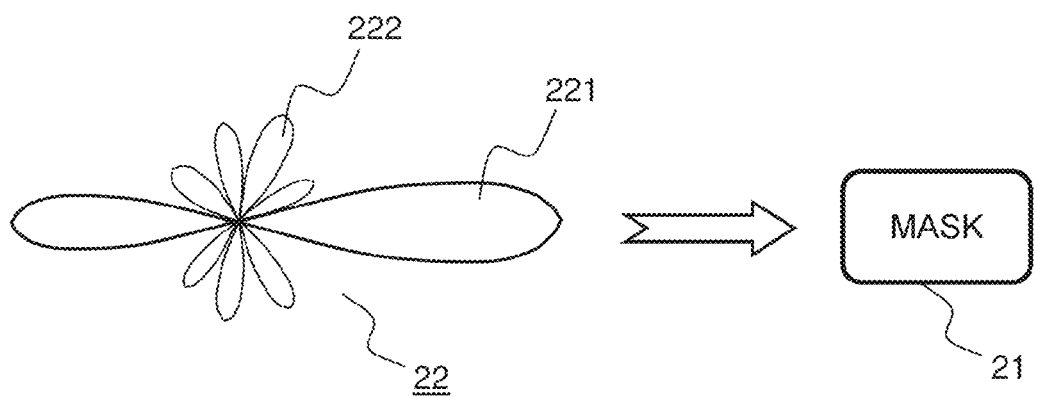
FIG. 2, an illustration of the principle of obtaining a distance/speed mask used by the method according to the invention.

FIG. 2 illustrates the principle of the method according to the invention. The method according to the invention uses the a priori knowledge of the, land or sea, clutter intercepted by the radar to construct a distance/speed mask 21, this mask being intended to filter the sidelobe echoes. This a priori knowledge of the clutter is obtained on the basis:

of the antenna parameters:
the antenna pattern 22 projected into the distance/speed domain 100 in elevation;
the, mechanical or electronic, antenna squint;
of the waveform parameters;
of the environmental context of the radar, that is to say in particular of the position of the carrier of the radar, of the attitude of the carrier and of the speed of the carrier.

The antenna pattern 22 is well determined. It is therefore known or can be calculated. The waveform parameters are of course also known. The antenna squint and the environmental context is also known throughout the mission. The radar processing means can therefore predict the land clutter intercepted by the sidelobes 222 of the antenna pattern which accompany the main lobe 220, for example by taking a flat earth or round earth assumption. The mask 21 is produced on the basis of this detection information. It is inserted into the detection chain to:
eliminate the unwanted echoes due to the ground clutter and intercepted by the sidelobes;
re-sensitize the detection processing for the samples in proximity to these unwanted echoes 10, 20 in the distance/speed domain.

Figure 3:
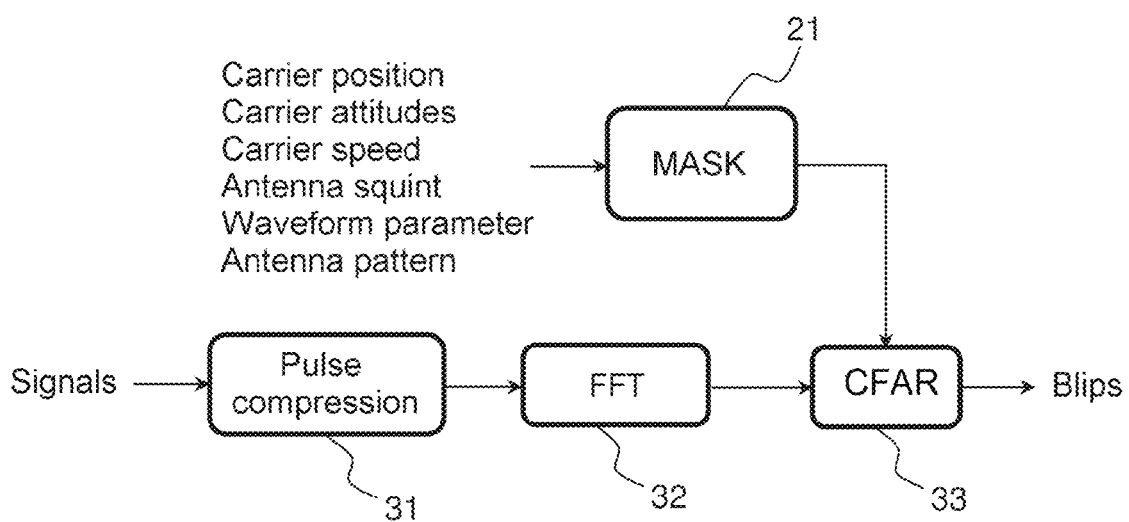
FIG. 3, an example of inserting the said mask into a detection processing chain.

FIG. 3 presents an example of inserting the mask into an, air-air or air-ground, detection processing chain conventionally comprising a pulse compression processing 31, a fast Fourier transform 32 and a processing with constant false alarm rate 33 leading to the formulation of radar blips in a manner known to the person skilled in the art. The signals received are thus compressed 31, and then the Fourier transform 32 (FFT) is applied for each distance bin on the horizon of a block (formed over several emission recurrences). On output from the FFT 32, one obtains a representation of the signals received in the distance/speed domain 100 in accordance with the representation of FIG. 1. The FFT operation 32 is followed by the processing with constant false alarm rate 33 (CFAR), this processing 33 applying a filtering by the mask 21. This filtering, described hereinafter, is aimed at eliminating the sidelobe echoes without impairing the sensitivity of detection.

Figure 4:
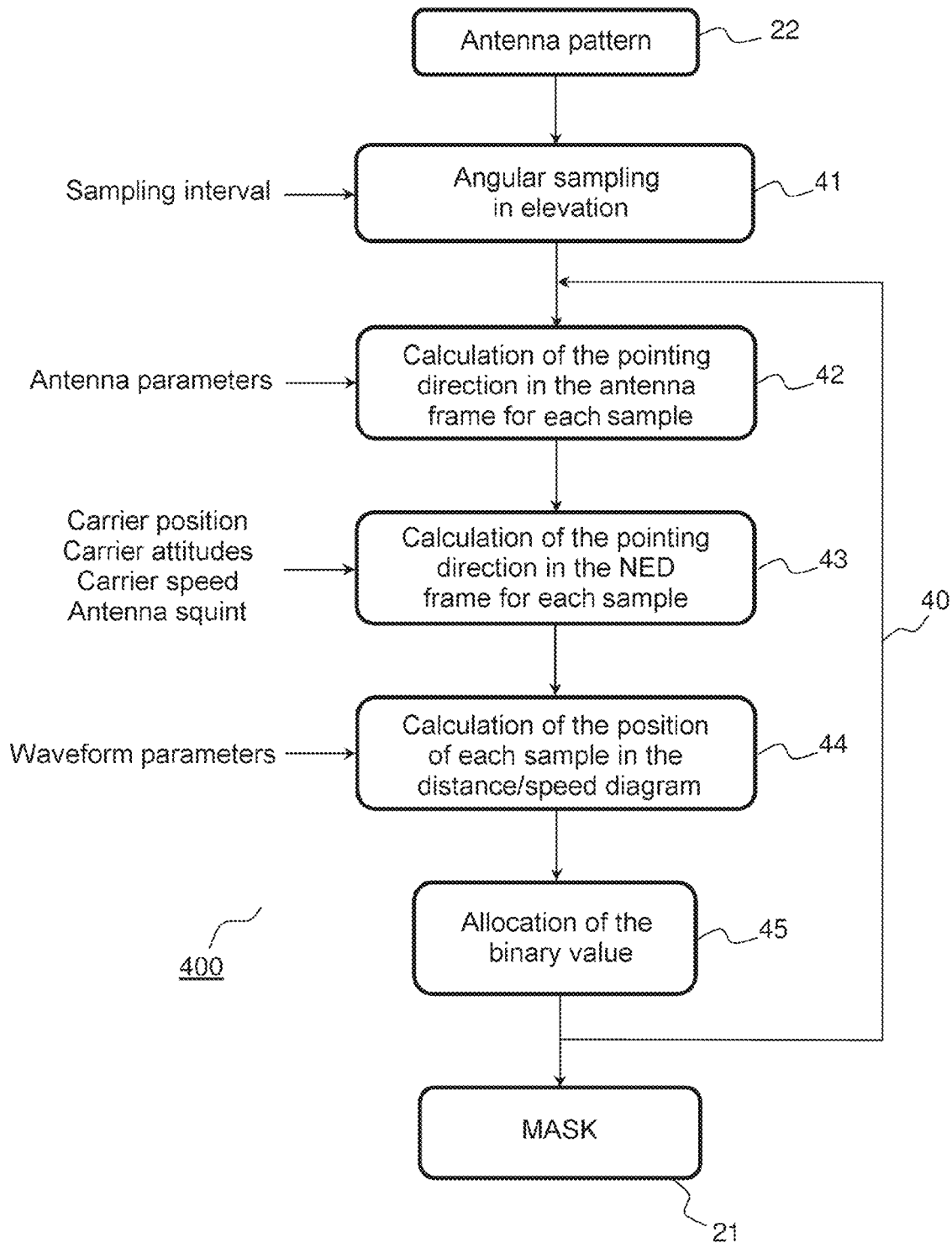
FIG. 4, an example of obtaining the said mask on the basis of various input parameters that are known a priori.

FIG. 4 illustrates step 400 of producing the mask 21. It presents more particularly an example of obtaining this mask 21. This mask is formulated in the distance/speed domain 100. It overlies the zone of detection of secondary echoes 10, 20. The function of the mask is to allocate a binary value to the set of points concerned of the distance/speed domain. The points concerned are the set of points of the domain of potential detection. The detection is or is not validated, according to the value allocated to the point. Stated otherwise, if the level of received power at a point of the distance/speed domain exceeds the detection threshold adopted, the detection is validated according to the binary value of the point defined by the mask.

With regard to FIG. 4, the possible steps of obtaining the mask are described hereinafter.

In a first step, the mask 21 is initialized to 1 for the whole set of points of the distance/speed domain.

The antenna pattern 22 is sampled in elevation 41 according to a given angular sampling interval. This interval is for example equal to 0.01°. The samples obtained correspond to the main lobe 221 and to the sidelobes 222, with reference to FIG. 2.

For all the points of the antenna pattern in elevation, more precisely for each sample:
the direction of pointing is calculated 42 in the frame of the antenna as a function of the angular parameters of the antenna squint;
the change of frame is performed 43 so as to express the direction of pointing of the antenna in the NED (North/East/Down) frame of the carrier, as a function of the position, of the attitude and of the speed of the carrier, and also as a function of the squint of the antenna;
the distance and the Doppler frequency of the sample are calculated 44 on the basis of the NED frame as a function of the parameters of the emitted waveform, the sample is thus positioned in the distance/speed domain 100;
in a last step 45, the binary value of the point calculated is allocated as a function of the position of the sample in the antenna pattern (main lobe or sidelobes projected into the distance-speed plane), more precisely the value of the distance/speed point of the domain 100 is forced to 0, corresponding to the calculated position of the sample if the latter belongs to a sidelobe and is therefore liable to generate a false echo.

Once this point of the mask has been calculated, the steps are recommenced 40 for the following sample, and so on and so forth until the whole set of samples has been considered.

The calculation of the mask is repeated throughout the mission of the radar so as to take account in particular of the evolution of the environmental context of the carrier. Step 400 of calculating the mask is for example performed after each burst of radar recurrences and before the processing in the reception chain 31, 32, 33.

Figure 5A:
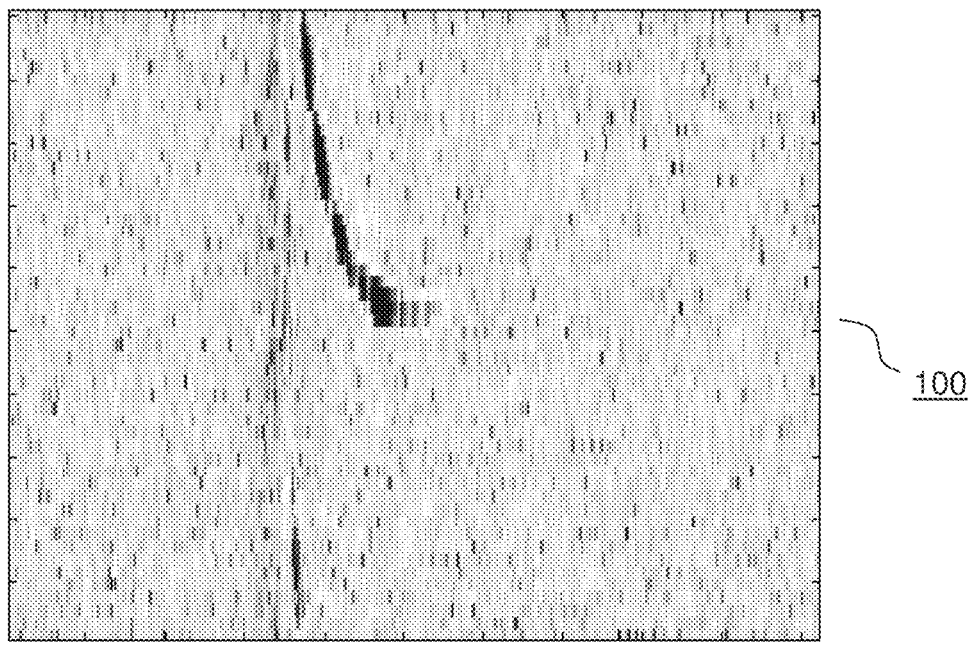
FIGS. 5a and 5b, respectively the representation of FIG. 1 and the mask projected into the corresponding distance/speed domain.
Figure 5B:
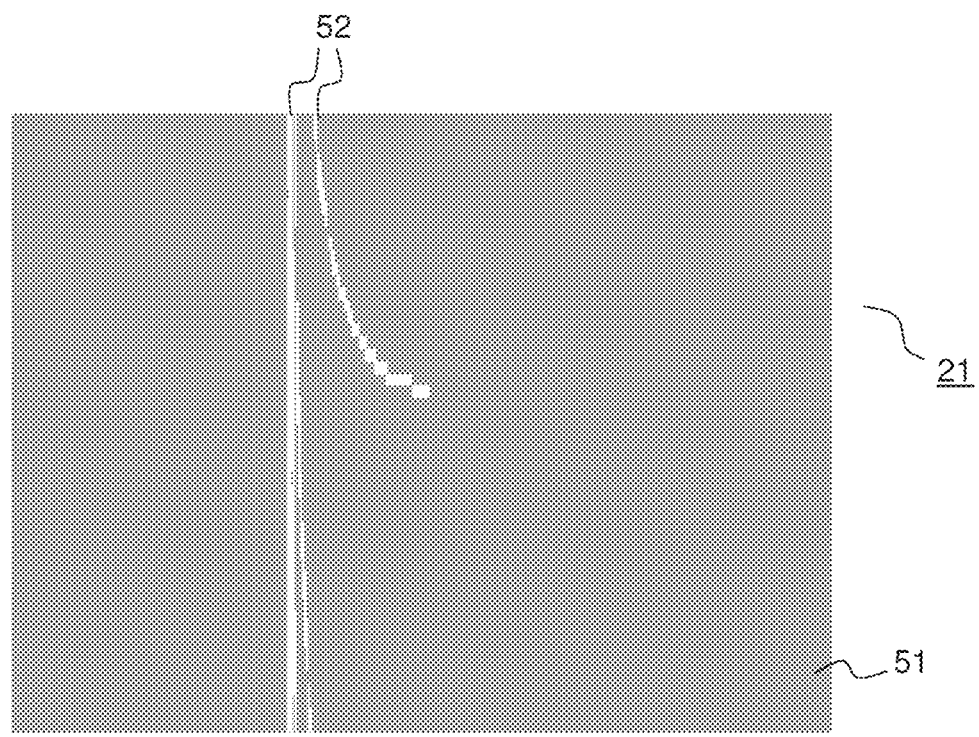

FIG. 5*b* illustrates the mask 21 obtained with regard to the distance/speed domain 100 shown in FIG. 5*a*.

The part in grey 51 represents the value 1 and the part in white 52 represents the value 0. The zone in white 52 is superimposed on the branches 10, 20 of clutter intercepted by the sidelobes. This zone 52 thus hugs the shape of the zone of detection of the secondary echoes. It forms the mask properly speaking.

It is possible to widen this masking zone 52 according to the two dimensions, distance and speed, more precisely the masked zone of value 0, so as to take account of the natural spreading of the clutter distance-wise and speed-wise. This widening makes it possible moreover to perform a registration of the mask as a function of the inaccuracies in the input parameters (position, attitude, speed of the carrier in particular). It is of course possible to establish an inverse logic by initializing the mask to the value 0 and by allocating the value 1 to the detections to be filtered.

The mask-specific binary value allocated to a point characterizes the fact that the said point is covered by the said mask. It is possible to envisage a characteristic other than a binary value.

The mask 21 is used in the reception chain for the calculation of the CFAR 33 as mentioned previously. It makes it possible to filter the false echoes due to the sidelobes and to clutter, ground or sea, in the following manner:
the samples whose value is 0 on the mask 21 (included in the masking zone 52) are not taken into account in the CFAR processing;
detections, if any, on output from the CFAR corresponding to samples whose value is 0 are rejected.

The (unmasked) samples whose value is 1 are preserved for the detection processing.

Thus, the detection processing does not take into account the masked samples, having the value 0 on the mask calculated in the distance/speed domain.

The masked samples are not tested. This advantageously makes it possible to decrease the false alarm rate and therefore to control the CFAR.

The masked samples are not taken into account for the calculation of the contrast of distance/speed bin under test with the mean noise level of the neighbourhood, thereby advantageously making it possible not to bring about any desensitization in the measurement of the environment. The zones 10, 20 where the ground clutter is intercepted by the sidelobes in elevation are not taken into account in the calculation of the detection threshold in the CFAR. One thus obtains a re-sensitization of the detection in proximity to the ground clutter zones.

Additionally, the input parameters cited for the calculation of the mask can be supplemented with a digital terrain model which specifies the attitude of the ground intercepted by the antenna pattern. The projection in the distance/speed domain is thus more precise by taking into account the altitude of the ground in addition to the other input parameters already cited (attitude, position and speed of the carrier, etc.).

The invention claimed is:
1. A method of filtering in a radar reception chain of the ground and/or sea clutter echoes intercepted by the sidelobes of an airborne radar, the said echoes being picked up in the distance-speed domain, the said method being wherein it comprises:

a step of producing a mask, in the distance-speed plane, overlying the zone of detection of the ground and/or sea clutter echoes picked up by the said sidelobes, the said zone being determinable by the antenna parameters of the said radar, the waveform emitted by the said radar and the environmental context of the said radar, all the points of the said distance-speed plane which are covered by the said mask being assigned a characteristic which is specific to the said mask;

a step of filtering the received echoes, in which the echoes covered by the said mask are rejected from the radar reception processing, wherein in that the said detection chain comprising a pulse compression processing, a Fourier transform and a processing with constant false alarm rate CFAR:

the echoes marked by the said characteristic specific to the mask are not taken into account in the CFAR processing;

detections, if any, on output from the CFAR corresponding to echoes marked by the said characteristic are rejected.

2. The method according to claim 1, wherein the said characteristic is a binary value.

3. The method according to claim 2, wherein the points not covered by the said mask are assigned the complementary binary value.

4. The method according to claim 1, wherein the antenna parameters being the antenna pattern and the squint of the antenna, the environmental context being the position, the attitude and the speed of the carrier of the said radar, step of producing the said mask consisting in assigning the points of the said distance-speed plane the said characteristic, the said step comprises the following steps:

the antenna pattern is sampled in elevation according to a given angular sampling interval, the samples obtained corresponding to the main lobe and to the sidelobes of the said pattern;

for each sample:

the direction of pointing is calculated in the frame of the antenna as a function of the angular parameters of the antenna squint;

a change of frame is performed so as to express the direction of pointing of the antenna in the NED frame of the said carrier, as a function of the position, of the attitude and of the speed of the said carrier, and also as a function of the squint of the antenna;

the distance and the Doppler frequency of the said sample is calculated on the basis of the NED frame as a function of the parameters of the emitted waveform, the said sample thus being positioned in the distance/speed domain;

the said characteristic is allocated to the said sample of the distance-speed plane if it corresponds to a sidelobe.

5. The method according to claim 4, wherein in an initial step, all the points of the distance-speed domain are assigned a binary value, the points of the said samples corresponding to the sidelobes being assigned the complementary binary value.

6. The method according to claim 1, wherein it uses a digital terrain model to specify the altitude in the said environmental context.

7. A radar, wherein it is able to implement the method according to claim 1.

* * * * *